United States Patent [19]

Gladden et al.

[11] 4,152,647

[45] May 1, 1979

[54] RAPIDLY DEPLOYABLE EMERGENCY COMMUNICATION SYSTEM

[75] Inventors: Charles A. Gladden; Martin H. Parelman, both of Las Vegas, Nev.

[73] Assignee: The United States of America as represented by the United States Department of Energy, Washington, D.C.

[21] Appl. No.: 880,818

[22] Filed: Feb. 23, 1978

[51] Int. Cl.$^2$ .............................................. H04B 7/20
[52] U.S. Cl. ........................................ 325/4; 325/54; 325/55; 179/2 EB
[58] Field of Search ................ 179/2 E, 2 EA, 2 EB, 179/15 AD, 15 BA, 15 BZ; 325/1, 3, 4, 53, 54, 55, 57; 343/175, 176, 177

[56] References Cited
U.S. PATENT DOCUMENTS

| | | | |
|---|---|---|---|
| 3,239,761 | 3/1966 | Goode | 325/55 |
| 4,056,779 | 11/1977 | Toler | 325/4 |
| 4,121,158 | 10/1978 | Hanni | 179/2 EB |

Primary Examiner—Benedict V. Safourek
Attorney, Agent, or Firm—Dean E. Carlson; John A. Koch

[57] ABSTRACT

A highly versatile, highly portable emergency communication system which permits deployment in a very short time to cover both wide areas and distant isolated areas depending upon mission requirements. The system employs a plurality of lightweight, fully self-contained repeaters which are deployed within the mission area to provide communication between field teams, and between each field team and a mobile communication control center. Each repeater contains a microcomputer controller, the program for which may be changed from the control center by the transmission of digital data within the audible range (300–3,000 Hz). Repeaters are accessed by portable/mobile transceivers, other repeaters, and the control center through the transmission and recognition of digital data code words in the subaudible range.

15 Claims, 5 Drawing Figures

RAPIDLY DEPLOYABLE EMERGENCY COMMUNICATION SYSTEM

BACKGROUND OF THE INVENTION

The invention described herein was made in the course of Contract No. EY-76-C-08-1183 with the U.S. Department of Energy. This invention relates to a communications system and more particularly to a highly versatile, highly portable emergency communication system which permits rapid deployment into the area of interest.

A number of emergency situations arise which necessitate the rapid deployment of a communication system. One type of such emergency situation involves searches for radioactive or other dangerous materials. Whether such dangerous materials have been lost or are the basis of terrorist or extortion plots, it is imperative to the public safety and tranquillity that the materials, if they do, in fact, exist, be found as soon as possible. Accordingly, a very rapid deployment of a comprehensive array of radiation measurement equipment and search teams of scientists and technicians to operate the equipment is generally required and this in turn necessitates the deployment of a portable, versatile communication system which will enable individual search teams or search team members to be in communication with each other and with the control center for the search operation.

The requirement for versatility in the communications system can be appreciated when it is realized that a variety of different search modes, such as by aircraft, land or water vehicles and on foot, will generally be employed in such an emergency, additional requirements such as unattended roadblock monitors and logistics personnel may be necessary, and there can, of course, be wide variation in the character, size, remoteness, etc., of the area that needs to be searched. Moreover, a particular scenario may require one or more redeployments of the individual elements of the search team and, therefore, of elements of the communication system before completion.

Several communication systems in the prior art have provided for the extension of the range and versatility of communication systems by the use of repeaters between transceivers of limited range and a base station. One such prior art system is that described in U.S. Pat. No. 3,745,462 to Melvin Earl Trimble and U.S. Pat. No. 3,955,140 to Berton H. Stephens and Jack Bradley. The basic system shown in these two patents involves the connection of an extension unit to a conventional mobile transceiver such as is commonly used in police vehicles. The extension unit converts the mobile transceiver into a repeater through which a police officer can remain in radio communication with the base station while away from his vehicle with the use of a small handheld transceiver of limited range. The latter of the two patents is an improvement on the basic system which provides for automatically inhibiting multiple transmissions by units within range of one another and provides punch through priority communications from a transceiver to the base station.

While the communication systems of the Trimble and Stephens et al. patents are useful for their intended applications, they do not have sufficient versatility to provide satisfactory communication systems over the wide variety of situations that arise in an emergency search operation of the type herein contemplated.

SUMMARY OF THE INVENTION

Accordingly, it is an object of the invention to provide a highly versatile, highly portable emergency communication system which may be rapidly deployed to provide communications over a large variety of emergency situations.

To briefly summarize, this is accomplished by a containerized mobile communications control center designed to be airlifted to the scene and installed adjacent to the facility chosen for a field headquarters (FHQ); a plurality of light-weight, self-contained repeater assemblies which are deployed, and redeployed as necessary, within the search area; and a large number of portable/mobile vehicle-mounted and handheld transceivers of limited range. Communication traffic normally flows between a portable mobile transceiver in the field through one or more repeater units to the field headquarters by way of the communications center. In specific segments of the search area, there may be inter- and intrateam communications that do not go through the communications center, but operate across a single or several repeaters.

Each repeater contains a receiver, a transmitter, and control means including a microcomputer. The receiver scans a plurality of carrier frequencies and selects one of those frequencies upon receipt of an appropriate digital data word access code on that frequency. The access code initiates activation of a transmitter key, which activates a transmitter with a capability of transmitting in any of a plurality of carrier frequencies, and selection of the particular transmitter frequency and access code for the next adjacent receiver. With the use of six carrier frequencies and a large digital data word format, the repeater microcomputer can receive and generate a finite but large number of unique commands. The number of these commands is limited primarily by the transmission time, data rate, and repeater microcomputer storage capacity.

Software for a number of preplanned deployment configurations may be provided for each repeater microcomputer. The particular software to be used in a particular operational scenario may be selected through digital data word signals transmitted from the communications center to the repeaters on one or more of the carrier frequencies. The software may also be changed in this manner to accommodate changes in the deployment configuration of the search teams as a particular search mission progresses. The software also controls all system priorities which can also be modified to accommodate specific requirements.

The individual mobile or handheld transceiver units each have a digital code word generator which is, when keyed, capable of continuously generating any one of a number of distinct repeater access and routing codes.

Additional objects and advantages and a better understanding of the invention will be apparent after consideration of the following description of a preferred embodiment thereof.

DESCRIPTION OF A PREFERRED EMBODIMENT

Figure 1:
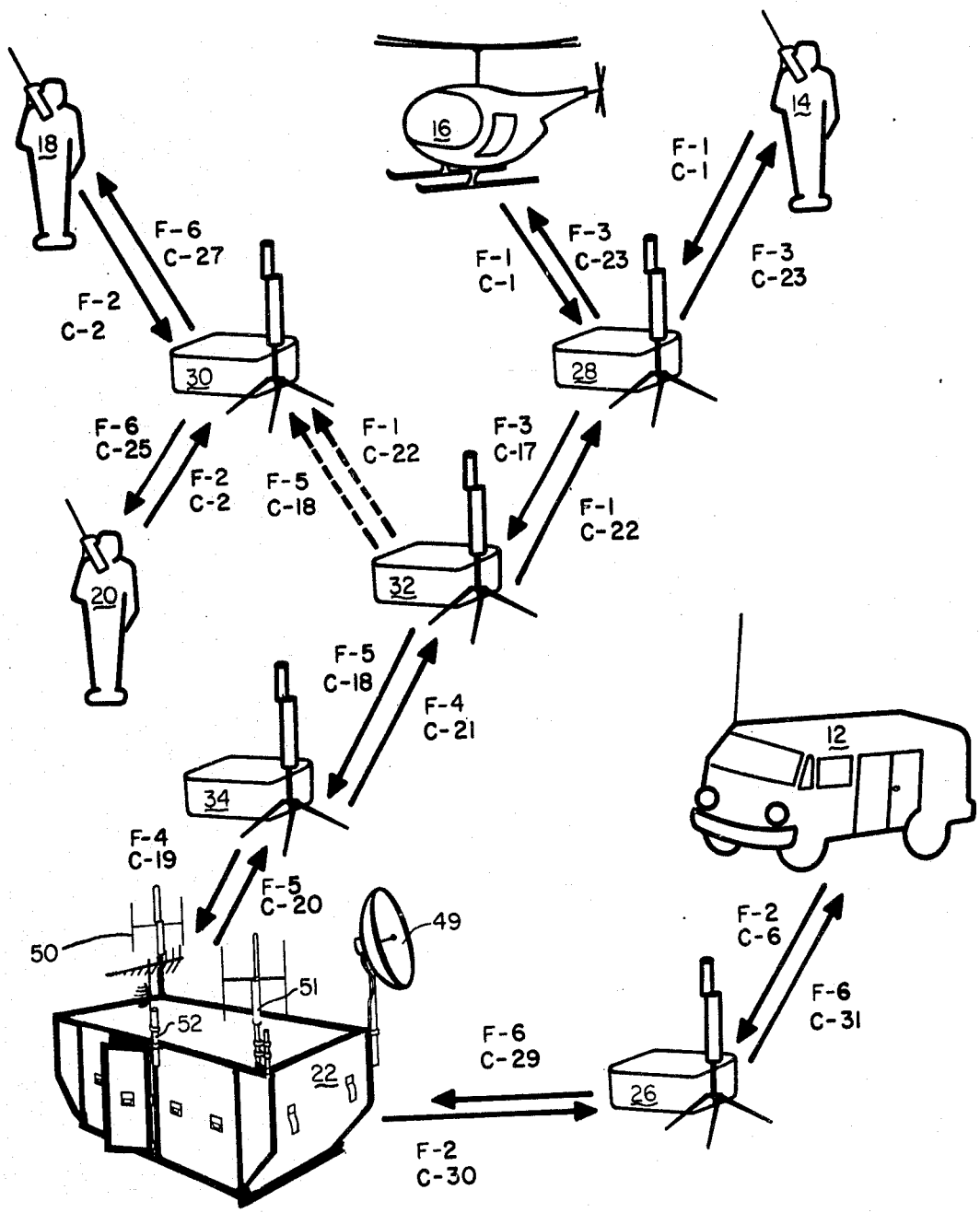
FIG. 1 is a diagrammatic representation of the deployment of various components of the system.

Referring now to the drawings, FIG. 1 shows a hypothetical deployment pattern of components of the communications system according to the invention with three separate simultaneous conversations taking place. As shown, the portable/ mobile transceiver units 12, and 14 and 16 (in parallel) are each in communication with central communications control unit 22 through repeater units 26, and 28, 32, and 34, respectively, and portable transceivers 18 and 20 are in communication with each other across repeater 30. Repeater units 26, 28, and 30 are generally referred to as working repeaters, whereas repeaters 32 and 34 of the series relay strings are generally called far and near repeaters, respectively.

The particular deployment pattern will, of course, be designed to meet the requirements of the particular search mission, FIG. 1 showing a particular configuration which is a combination of likely configurations. Further, both the size of the area and the required coverage within the area may vary during the course of the search operation. Users of the system may include individuals on foot represented by symbols 14, 18, and 20; ground or water search vehicles represented by symbol 12 and search aircraft represented at 16. Additional uses and individual users not represented on FIG. 1, such as unattended roadblock monitors, logistics personnel, off-duty personnel, and others, may also be serviced by the system. Any of the symbols 12, 14, 16, 18, and 20 represents any of these possible users. As an area is searched and cleared, repeaters may be reprogrammed and/or relocated to meet changing operational needs.

Figure 2:
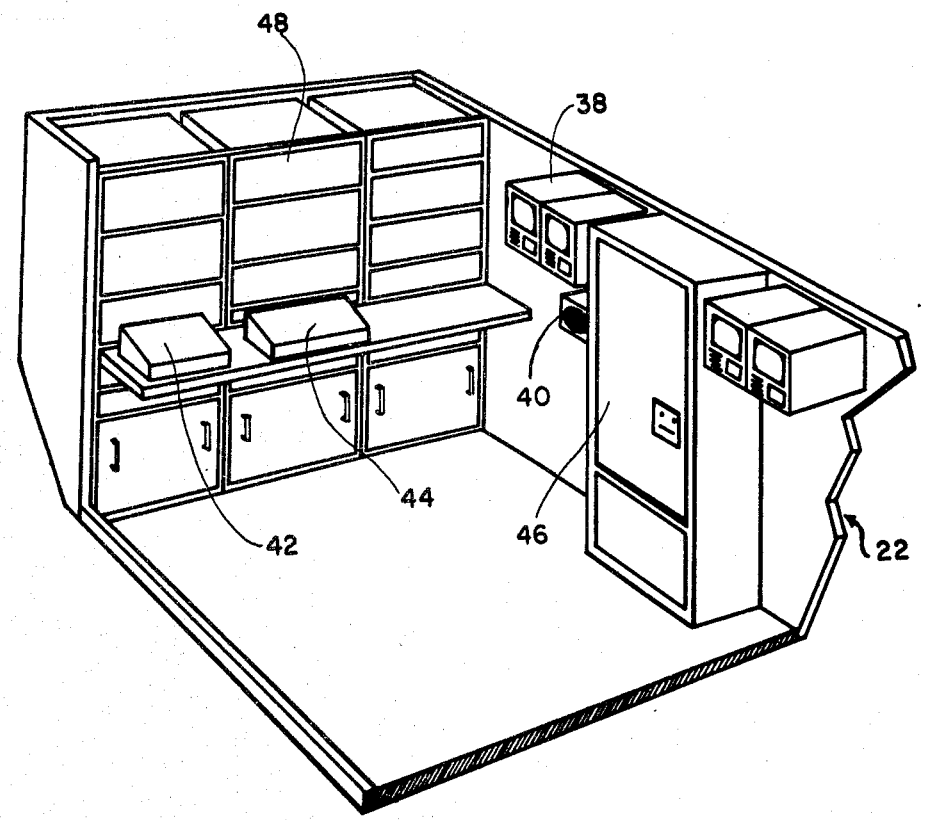
FIG. 2 is a cutaway view of the containerized communications center shown in FIG. 1.

In one embodiment of the invention, in order to enhance the portability and versatility of the systems, communications control center 22 was actually an airline cargo container which had been modified to contain the necessary electronic equipment. FIG. 2 is a left cutaway view of that modified container showing part of the equipment installation including TV monitors shown typically at 38, intercom 40, computer terminal 42, telecopier 44, air conditioner 46, and a number of electronic chassis shown typically at 48. The electronic components of the conrol center include receiver, transmitter, and control means; including means to receive, recognize and transmit appropriate access control and programming signals as will be more thoroughly understood after consideration of the explanation of the repeater function and operation hereinafter.

Upon the occurrence of an incident for which a search mission is initiated, communications control center 22 is airlifted, or otherwise transported, to the scene and installed adjacent to the facility chosen for the field headquarters, FHQ (not shown in the drawings). Repeaters and portable/ mobile transceivers are then deployed in accordance with the search plan. The communications center can immediately provide on-scene radio communication to the mission commander in the FHQ. With local telephone company support, the communications control center 22 can also provide the FHQ with a multiline telephone system. The center also houses a microwave system capable of providing video communications through antenna 49 (FIG. 1) with a remote location as will be further discussed. Radio duplexer antennas 50 and 51 are for the radio communications of the system and antennas 52 is for televsion reception.

Figure 3:
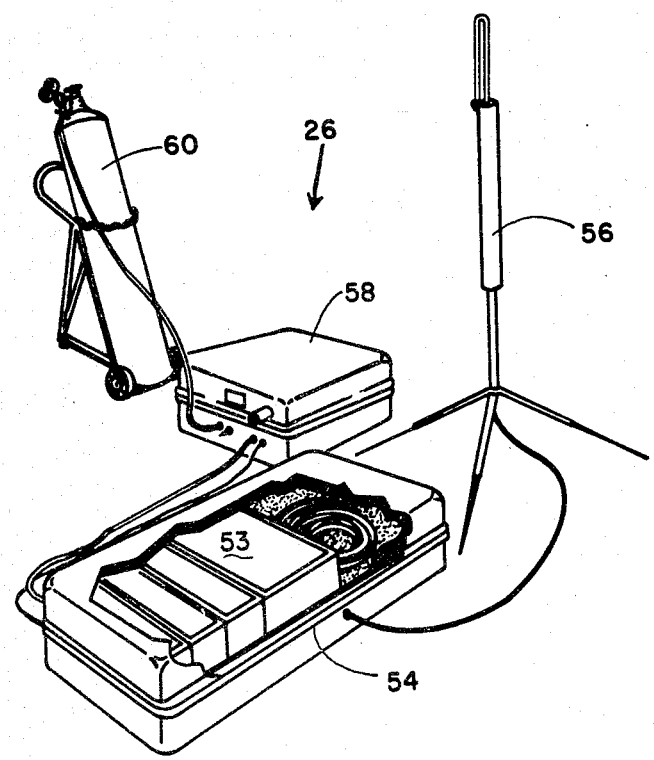
FIG. 3 is a view of a repeater station.

A lightweight, self-contained repeater system 26 shown in FIG. 3 is a key to providing wide area radio coverage for field teams under the command of the FHQ. The electronic components and circuitry for the receiver, transmitter, and other functional units making up the repeater are housed in chassis such as 53, which are in turn packaged within a weatherproof container 54. In one embodiment of the invention, high-impact resistance, second generation thermoplastic containers obtained from Skydyne of Port Jervis, New York, were utilized for that purpose. Duplexer antenna 56 is connected to the appropriate electronic components.

Repeater 26 is powered with its own power source such as fuel cell 58, which is connected directly to a tank 60 of a fuel such as hydrogen. In one embodiment of the invention, a 750 watt hydrogen fuel cell provided 24 volts d.c. using metal hydride for hydrogen storage. The metal hydride tank 60 weighing about 50 pounds with 1/2 pound of hydrogen provided about 380 ampere hours of energy. This represents about a 4 to 1 advantage over a standard rechargeable 12 volt battery which, if course, could be used as an alternative power source. A standard battery of 50 pounds would provide about 90 ampere hours. The hydride tank was obtained from Billings Energy Corporation of Provo, Utah.

Figure 4:
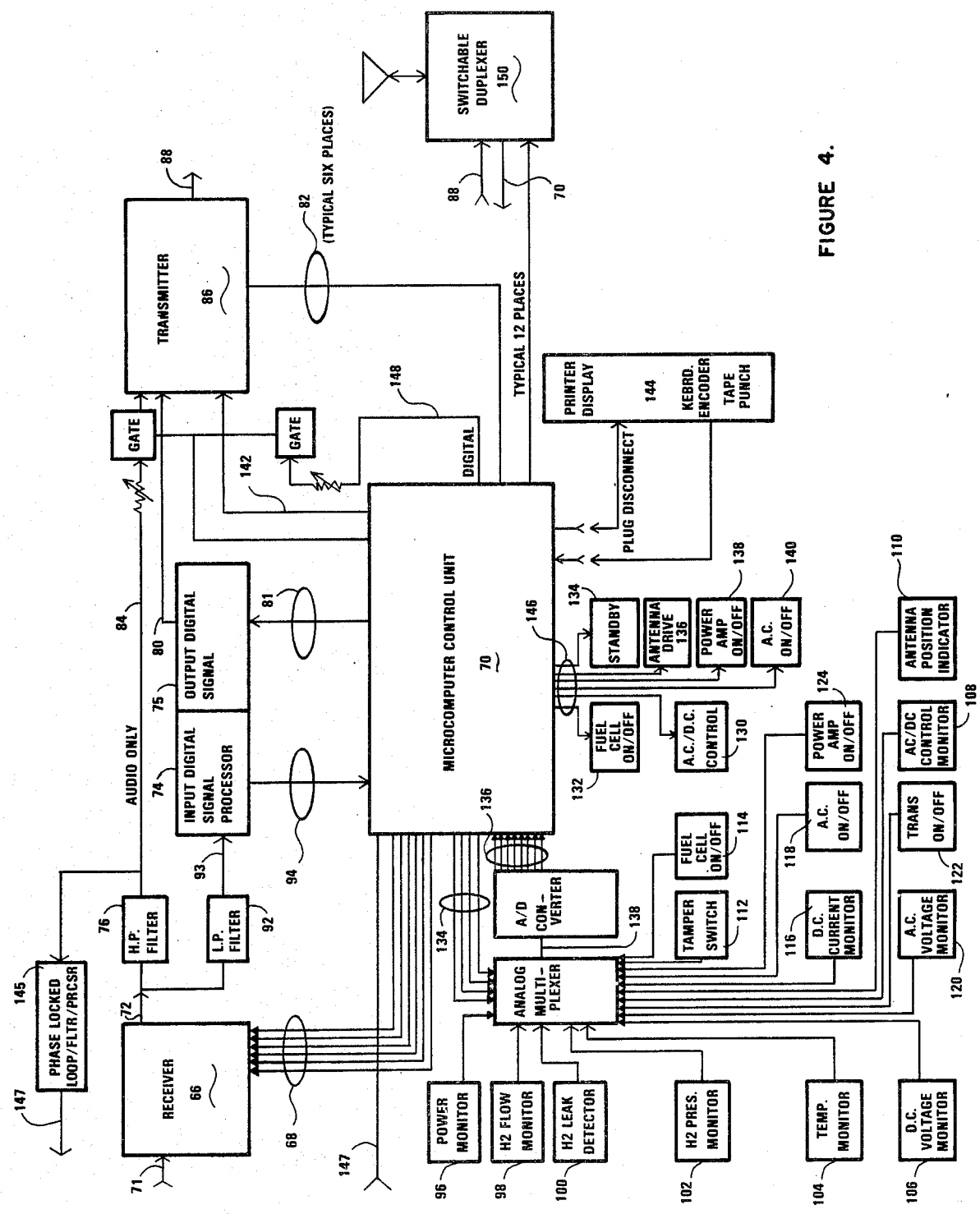
FIG. 4 is a block diagram of a repeater used in the FIG. 1 deployment configuration.

A block diagram of the electronics incorporated in the repeater of FIG. 3 is shown in FIG. 4. The most significant of the repeater functions will now be described in conjunction with the assumed deployment pattern of FIG. 1. For purposes of the description, it will be assumed that a limit of six radio (RF) carrier frequencies, which is the number actually employed in one embodiment of the invention, are to be utilized by the communication system.

At any given time, each of the repeaters 26, 28, 30, 32, and 34 is assigned and programmed to recognize a number of unique digital code words, one of which must be transmitted by the mobile/portable transmitter unit, another repeater, or communications control center before the particular repeater can be selected. Each of the portable/mobile transceivers 12, 14, 16, 18, and 20 and communications center 22 includes means for generating and transmitting these code words. The receiver section 66 of each repeater is capable of receiving any of the six possible RF carrier frequencies. Each receiver section 66 in each repeater, unless otherwise occupied, will scan all six frequencies in small time segment steps under the direction of receiver frequency select portion 68 of microcomputer 70. In one particular embodiment, the scan steps were of 50 ms duration, with the entire cycle being approximately 300 ms long. Thus, access to any repeater and operation of that repeater requires an interception at 71 of one of the six carrier frequencies that has been modulated by a particular digital code access word signal.

The operator of one of the portable/mobile transceivers 12, 14, 16, 18, or 20 selects the specific repeater access code for the repeater closest to him, or if he does not know which repeater is closest to him, makes a trial and error selection by sequentially activating the code switches on his transceiver and listening for the repeater clear signal (500 ms of 1000 Hz audible tone) which the repeater transmits upon accepting the frequency and code presented to its receiver. In the event the operator desires to converse locally across the selected repeater, such as in the case of units 18 and 20, he then uses the same code switch to initiate the transmission. If he desires to communicate with a distant point, such as with the communications center directly or through one or more repeaters, he selects an alternate code switch which designates the particular transmission termination point. As will be more thoroughly explained, the microcomputer 70 of each local repeater, such as 28, and intermediate repeater, such as 32 and 34, is programmed to progressively select proper frequencies and include appropriate digital code words upon retransmission of the intelligence received. Once the channel is established, it is reserved for that portable/mobile only for approximately 5 seconds. The 500 milliseconds/1000 Hz audible tone notifies the operator of the portable/mobile unit that the channel is available. In the case of portable/mobile transceiver 16, for instance, capture of repeater 28 would require a preprogrammed combination of a valid frequency and a valid digital code word, whereas capture of any of the other repeaters 30, 32, 34, or 26 by transceiver 16 would require the distinct digital code word of that particular repeater (depending upon the particular location of 16 at the time). The subaudible digital code access word must be continuously transmitted during conversation since repeater transmitter key 142 is controlled by the code.

The output 72 of repeater receiver 66 is the audio signal and subaudible digital code access word which is the input into high pass filter 76 and low pass filter 92. The audio signal 84 minus the subaudible access code is outputted from high pass filter 76 and encoded in the transmitter, under the control of digital code portion 81 of microcomputer 70, with the access code of the next adjacent receiver to which the transmission is directed. In the case of working repeater 28, the next adjacent receiver would be either that of far repeater 32 or the portable mobile units 14 and 16 depending upon the direction of the conversation. In the case of working repeater 26, it would be the receiver of communication control center 22 or portable/mobile 12. It would be the receiver of either portable/mobile transceiver 18 or 20 in the case of repeater 30 with conversation taking place between those two units as shown in FIG. 1.

The digital code words in the output 72 of receiver 66 are passed at 93 into digital signal processor 74 by low pass filter 92 and utilized by microcomputer 70 to produce output 81 to control the selection of new digital codes by output digital signal processor 75 outputted at 80. While the only digital code words that will be received from a portable/mobile unit is the repeater access code, destination code, and unit identifier code, a large number of commands can be sent to the repeater from communication control center 22 by way of digital code words. A large but finite number of unique commands can be generated. As indicated earlier, the number of these commands is limited primarily by the transmission time, data rate, and repeater storage capacity.

The transmission carrier frequency, selected by transmitter frequency select portion 82 of microcomputer 70, is modulated with the audio output 84 of high pass filter 76 and digital code word output 80 of digital signal processor 75 in transmitter section 86 and transmitted thereby at 88 through a duplexer 150.

In one embodiment, duplexer 150 was a switchable band reject-type duplexer system capable of 30 frequency combinations and permutations. It was constructed of 12 fixed-tuned cavities and 6 monolithic crystal filters. The cavities were shared between the transmitter and receiver depending upon the selected frequencies. Crystal filters were permanently installed in the receiver side and selected according to the receiver frequency. In addition, a low-noise broad band RF preamplifier was installed in front of the crystal filter to offset an inherent insertion loss. Selection of all cavities and crystal filters of duplexer 150 is under the control of microcomputer 70.

As previously explained, the selection of the particular encoding data word output at 80 and particular transmission carrier frequency is under the control of microcomputer 70. The particular output of digital code portion 81 and frequency select portion 82 of microcomputer 70 is a function of input 94 from digital signal processor 74 and the computer program. In one embodiment, microcomputer 70 was a Z-80 system by Zilog of Cupertino, Calif. That system contained a combination of 65 K bytes of random access memory and erasable programmable read only memory. Computer 70 may be programmed and receive other control commands by the reception of digital data words in the audible range (300–3,000 Hz) by receiver 66. Such commands would normally be transmitted from control center 22 during a search operation, although microcomputer 70 is connectable to printer/display/keyboard encoder/tape punch unit 144 for manual programming (and trouble-shooting). After passing through high-pass filter 76, these data words will be processed by phase locked loop/filter/processor 145 and input into microcomputer 70 at 147.

A typical pattern of frequency and digital access code signal combinations utilized during the simultaneous transmission of three conversations is shown in FIG. 1. In the case of repeater 28, for example, its microcomputer 70 would be programmed to transmit a specific carrier frequency and digital code word combination, i.e., F-3 and C-17, which far repeater 32 is programmed to receive upon receipt of code C-1 from a portable/-mobile transceiver such as 14 or 16.

It will be noted that, as shown on FIG. 1, repeater 30 is programmed to interpret the combinations F-1, C-22 and F-5, C-18 transmitted by repeater 32 as busy signals, as represented by the dashed arrows between repeaters 32 and 30, during the time that repeater 32 is under the control of repeater 28. During times when repeater 32 is under the control of repeater 30, a different combination would be transmitted by repeater 32 which repeater 28 would be programmed to interpret as busy signals.

The digital code word from the repeater transmitter is required by communication center 22 for originating repeater identification and/or destination. For all incoming traffic to the communications center, the digital code word which represents the originating repeater will be stored in computer memory and displayed on the operator's console, normally in the FHQ (not shown), thereby allowing the operator to respond to the proper repeater. The transmissions from near repeater 34 which originate from repeater 30 will have a different digital code word from transmissions originating from repeater 28.

While a digital code word is not required for reception by a portable/mobile unit, it may be transmitted as a busy signal for adjacent repeaters in a manner similar to that previously described with respect to repeater 32 and repeater 30. Thus, for a specific conversation, the frequencies of the portable/mobile unit will remain fixed, while the frequencies of the intermediate repeater may vary.

Priority transmissions, such as from unmanned roadblock monitors, are provided for by assigning an individual code which microcomputer 70 of the adjacent repeater is programmed to recognize as a priority throughput transmission. The roadblock monitor code is processed by digital signal processor 74 and the repeater carrier is modulated by it, along with the other intelligence, in transmitter 86. A scratch pad memory, which is provided as part of microcomputer 70 of the repeater, stores these priority codes until a clear channel becomes available for transmission to communication center 22. When these priority codes are received by the communication center, they are decoded to identify the alarming unit. After reception and identity decoding at the communication center, a signal is transmitted to the receiving repeater to erase the scratch pad memory in its microcomputer 70. The roadblock monitor transceiver will continue to transmit for a period of one and one quarter times the repeater transmitter "time out" timer period. This, combined with the scan restart on the roadblock frequency, will assure repeater reception of the roadblock signal. Once the repeater recognizes and stores in memory a roadblock code, it will no longer recognize that particular code for a time equal to the roadblock transmission period. The repeater receiver will therefore continue to scan.

Analog multiplexer 128 and analog to digital converter 126 allow microcomputer 70 to monitor the assorted repeater internal and external conditions, identified in the blocks bearing the even reference numbers starting with 96 and ending with 124 in FIG. 4, which may jeopardize proper repeater operation. Microcomputer 70 outputs identified at 134 are binary code select lines used to gate on those individual monitor channels 96 through 124 in analog multiplexer 128. Analog to digital converter 126 accepts analog data 138 from analog multiplexer 128 and converts to a digital word 136 which is input into microcomputer 70. Data input 136 is compared with preprogrammed limits in microcomputer 70. In the event one or more channels are not within prescribed limits, microcomputer 70 outputs a transmitter key 142 and digital data 148, thereby transmitting the alarm and associated intelligence in the manner of other transmissions as previously described.

Microcomputer 70 outputs control information at 146, which is derived from either input control signals 147 or monitor inputs 136, in a programmed manner. Controls 130, 132, and 140 select primary or alternate power sources. Antenna drive 136 may be provided to reposition the repeater antenna for desired coverage if a directional antenna is used at 56 (FIG. 3). Standby 134 turns off repeater power to all repeater equipment except microcomputer 70 and receiver 66. This is done to conserve fuel or battery power during periods of nonuse. Power amplifier on/off 138 is included to provide for two RF transmission power levels.

Figure 5:
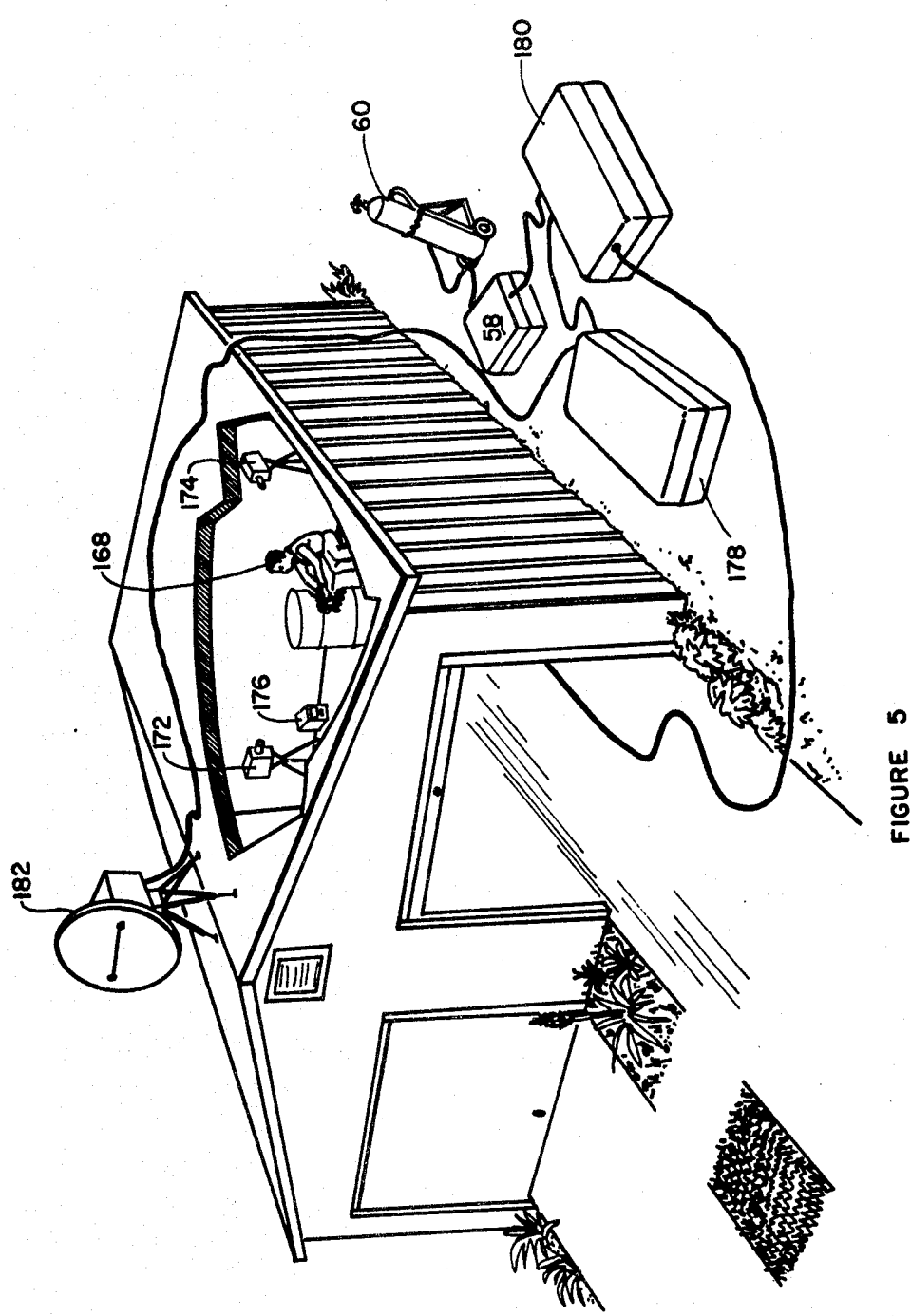
FIG. 5 is a view of a hypothetical suspect object location.

Video communications may also be provided between control center 22 and one or more remote locations. FIG. 5 shows an arrangement of equipment at a hypothetical suspect object location. Video communications are provided to search team member 168 through video cameras 172 and 174, video receiver 176, a microwave transmitter/receiver and associated electronics in electronic packages 178 and 180, and dish antenna 182. Fuel cell 58 and fuel tank 60 would ordinarily be the same as that already described in connection with FIG. 3. The repeaters of the system, as already described in connection with FIG. 3, are adapted to have additional microwave transmitter and receiver components and associated electronics, including one or more microwave antennas, connected thereto. These additional components would most conveniently be packaged in a separate electronics package similar to that of 54 of FIG. 3, and adapted to be connected to the package 54 of the particular repeater or repeaters utilized in the chain between the suspect object location and communications center 22, through suitable means. In one embodiment of the invention, six frequencies were used in the 4.4–4.99 GHz band to provide two microwave channels, one in each direction, each with video and 48 channels of combined audio, command and control information. Specific frequencies utilized would be coordinated on a noninterfering basis dependent upon the specific deployment location.

Accordingly, while the fundamental novel features of the invention have been shown and described and pointed out as applied to embodiments particularly described, it will be readily appreciated by those skilled in the art that various omissions, substitutions, and/or changes may be made within the principle and scope of the invention as expressed in the appended claims.

What we claim is:

1. In a deployable emergency communication system, apparatus comprising:
    a. a portable communications center, having receiving and transmitting means, adapted to be transported to the scene of an emergency for temporary use thereat,
    b. a plurality of portable/mobile transceivers of limited range, and
    c. a plurality of portable, self-contained repeaters adapted to be deployed within an area at said scene to provide repeater services between (i) two or more portable/mobile transceivers, (ii) between portable/mobile transceivers and said communications center, and/or (iii) between portable/mobile transceivers, one or more other repeaters in sequence, and said communications center as required by the deployment pursuant to a particular emergency, at least one of said repeaters comprising:
    (1) receiving means,
    (2) transmitting means, and
    (3) control means for
        (a) directing said repeater receiving means to periodically scan a plurality of carrier frequencies,
        (b) selecting one of said scanned frequencies upon reception of said frequency containing an appropriate access signal,
        (c) selecting a transmitter frequency from a plurality of possible transmitter frequencies, and
        (d) directing said repeater transmitting means to retransmit on said selected transmitter frequency intelligence contained in said received frequency minus said access signal but including an access signal for the next adjacent receiving means to which said transmission is directed.

2. The apparatus of claim 1 wherein at least one of said portable/mobile transceivers includes means for generating and transmitting at least one access code signal for an adjacent receiving means.

3. The apparatus of claim 2 wherein at least one of said transceivers transmits a plurality of distinct access code signals and said control means in at least two of said repeaters select frequencies upon receipt of different ones of said distinct access code signals.

4. The apparatus of claim 3 wherein said plurality of distinct access code signals are digital data words.

5. The apparatus of claim 1 wherein said repeater control means include a microcomputer.

6. The apparatus of claim 5 wherein said microcomputer includes means for programming its functions.

7. The apparatus of claim 6 wherein said means for programming are responsive to signals received by said repeater receiving means.

8. The apparatus of claim 6 wherein said communications center includes means for transmitting programming signals for said means for programming.

9. The apparatus of claim 8 wherein at least one said transceivers transmits a plurality of distinct access code signals and said control means in at least two of said repeaters select frequencies upon receipt of different ones of said distinct access code signals.

10. The apparatus of claim 1 wherein said repeater control means includes means for preempting normal reception functions in response to reception of a priority access signal.

11. The apparatus of claim 10 wherein at least one of said plurality of portable/mobile transceivers has means for transmitting a priority access signal.

12. In a deployable emergency communication system, the method comprising:
   a. providing (i) a portable communications center having receiving means and transmitting means, (ii) a plurality of self-contained repeaters having receiving means, transmitting means, and programmable control means, and (iii) a plurality of portable/mobile transceivers,
   b. transporting said communication center to the scene of an emergency for temporary use thereat,
   c. deploying said repeaters within an area at said scene in accordance with a plan for providing repeater coverage within said area,
   d. programming said control means in each of said repeaters to:
      (1) direct its receiving means to periodically scan a plurality of carrier frequencies capable of being transmitted by (i) said communications center, (ii) one or more of said portable/mobile transceivers, and/or (iii) other repeaters depending upon the function of the particular repeater in said area,
      (2) select one of said scanned frequencies upon receipt of said frequency containing an appropriate access signal,
      (3) select a transmitter frequency from a plurality of possible transmitter frequencies capable of being received by (i) said communications center, (ii) said portable/mobile transceiver, and/or (iii) other repeaters depending upon the function of the particular repeater in said area and said access code contained in said selected receiver frequency, and
      (4) direct its transmitting means to retransmit on said selected transmitter frequency intelligence contained in said received frequency minus said access signal but including an access signal for the next adjacent receiving means to which said transmission is directed.

13. The method of claim 12 wherein said step of programming said control means is performed in part before said deployment of said repeaters and in part after said deployment of said repeaters.

14. The method of claim 13 wherein at least part of said part of said programming step performed after deployment is performed by transmitting signals to at least one repeater from said communications center.

15. The method of claim 13 further comprising the step of reprogramming said control means by transmitting signals from said communications center in accordance with a revision to said plan for providing repeater coverage.

* * * * *